United States Patent
Fukukawa et al.

[11] Patent Number: 5,601,378
[45] Date of Patent: Feb. 11, 1997

[54] ROD-END BEARING DEVICE

[75] Inventors: Takao Fukukawa, Fukuroi; Masao Takayama, Hamamatsu; Masahiro Yamada, Shizuoka, all of Japan

[73] Assignee: Kabushiki Kaisha Somic Ishikawa, Tokyo, Japan

[21] Appl. No.: 565,969

[22] Filed: Dec. 5, 1995

[30] Foreign Application Priority Data

Dec. 8, 1994 [JP] Japan .................................. 6-305251

[51] Int. Cl.$^6$ .................................................. F16C 11/06
[52] U.S. Cl. ............................ 403/140; 403/135; 403/50; 403/122; 277/212 FB; 29/898.046
[58] Field of Search ............................... 403/50, 51, 282, 403/11, 122, 134, 135, 140, 131, 128; 277/212 FB; 29/898.043, 898.044, 898.045, 898.046

[56] References Cited

U.S. PATENT DOCUMENTS

| | | | |
|---|---|---|---|
| 3,125,364 | 3/1964 | Springer | 403/51 |
| 4,089,095 | 5/1978 | Becker | 29/898.044 |
| 4,241,928 | 12/1980 | Nemoto et al. | 277/212 FB |
| 4,527,803 | 7/1985 | Rose | 403/51 X |
| 4,559,692 | 12/1985 | Morin | 29/898.046 X |
| 5,066,159 | 11/1991 | Urbach | 277/212 FB X |

Primary Examiner—Anthony Knight
Attorney, Agent, or Firm—The Morrison Law Firm

[57] ABSTRACT

A rod-end bearing device includes a ball seat crimped in place within an inner chamber of a housing. A ball head of a ball stud slides in the ball seat. An insertion hole for the ball stud flares outward at its outer end. A thick pressed portion contacts the housing around the outer surface of the ball seat, near the insertion hole. An indented portion around the outer perimeter of the pressed portion adjacent the insertion hole receives an annular raised portion of a dust cover. A generally thick portion of the ball seat transmits forces from contact by the stud portion of the ball stud to the housing when the ball stud is at its maximum angular extent. The force transmission is defined by a force line from the contact point to the housing. The indented portion is located axially outward from the force line. This separation of the indented portion from the force line retains the sealing ability of the dust cover.

4 Claims, 6 Drawing Sheets

ROD-END BEARING DEVICE

BACKGROUND OF THE INVENTION

This present invention relates to a rod-end bearing device having a dust cover.

A rod-end bearing device having a dust cover disclosed in Japanese Utility Model Publication No. 39452/1988 has a ball seat between an interior wall of an inner chamber of a housing and an outer surface of a ball head of a ball stud. An annular concavity around the outer surface of an open end of the ball seat receives a raised ring around an inner surface at the end of a dust cover.

When the open end of the housing is deformed, the entire perimeter of the open end of the ball seat and the outer surface of the raised ring of the dust cover are pressed together and thus secured. Such a configuration is effective in maintaining superior sealing capability, improving the operating ability of the ball seat and dust cover, keeping the dust cover in a secured condition and reducing the size of the device.

However, when the ball stud swings to its maximum extent, the stud portion of the ball stud abuts an edge of the open end of the ball seat. Extra force applied to the ball stud in the direction in which the ball stud is currently swinging may deform the ball seat sufficiently to allow the dust cover to slip off the ball seat or be damaged.

Additionally, deformation of the open end of the ball seat reduces resistance of the ball stud to slipping out of the ball seat. In order to overcome such problems, the thickness of the housing has to be increased, thereby increasing the size and cost of the entire device.

OBJECTS AND SUMMARY OF THE INVENTION

Accordingly, an object of the present invention is to overcome the drawbacks and limitations of the prior art.

Another object of the present invention is to provide a rod-end bearing device which improves sealing capability of the dust cover and increases resistance of the ball stud to slipping out of the ball seat.

A still further object of the present invention is to reduce the force per unit area applied to the ball seat in the direction of the swing of the ball stud to prevent permanent deformation or other damage to the ball seat.

Briefly stated, a rod-end bearing device includes a ball seat crimped in place within an inner chamber of a housing. A ball head of a ball stud slides in the ball seat. An insertion hole for the ball stud flares outward at its outer end. A thick pressed portion contacts the housing around the outer surface of the ball seat, near the insertion hole. An indented portion around the outer perimeter of the pressed portion adjacent the insertion hole receives an annular raised portion of a dust cover. A generally thick portion of the ball seat transmits forces from contact by the stud portion of the ball stud to the housing when the ball stud is at its maximum angular extent. The force transmission is defined by a force line from the contact point to the housing. The indented portion is located axially outward from the force line. This separation of the indented portion from the force line retains the sealing ability of the dust cover.

According to an embodiment of the present invention, a rod-end bearing device includes a housing, an inner chamber in the housing, the inner chamber having an aperture at a first end and an inner surface at a second end thereof, a ball seat disposed in the inner chamber, the ball seat having an insertion hole at an end thereof, the ball seat having an indented portion about its perimeter adjacent to an outer edge of the insertion hole, a crimped portion at an outer end of the housing crimped over a portion of the ball seat to retain the ball seat in the housing, a ball stud having a ball head and a stud portion, the ball head being disposed in the ball seat with an outer surface thereof in sliding contact with the ball seat, the stud portion projecting from the aperture through the insertion hole, a dust cover disposed between the housing and the outer surface, the dust cover having an annular raised portion at a first end thereof, the annular raised portion being fitted in the indented portion, the dust cover having a lip at a second end thereof, the lip fitting on the stud portion, the stud portion contacting the ball seat at a contact point when the stud portion is at its maximum angular position, and the indented portion being located a distance A axially further outward of the ball seat than the contact point.

According to an embodiment of the present invention, a rod-end bearing device includes a housing, an inner chamber in the housing, the inner chamber having an aperture at a first end and an inner surface at a second end thereof, a ball seat disposed in the inner chamber, the ball seat having an insertion hole at an end thereof, the ball seat having an indented portion about its perimeter adjacent to an outer edge of said insertion hole, the ball seat having an annular pressed portion projecting outward from the ball seat, a crimped portion at an outer end of the housing crimped over a portion of the ball seat to retain the ball seat in the housing, a ball stud having a ball head and a stud portion, the ball head being disposed in the ball seat with an outer surface thereof in sliding contact with the ball seat, the stud portion projecting from the aperture through the insertion hole, a dust cover disposed between the housing and the outer surface, the dust cover having an annular raised portion at a first end thereof, the annular raised portion being fitted on the annular pressed portion, the dust cover having a lip at a second end thereof, the lip fitting on the stud portion, and the annular pressed portion being disposed below an edge of the indented portion.

According to an embodiment of the present invention, a rod-end bearing device includes a housing, a ball seat in the housing, a ball stud, the ball stud including a ball slidingly fitted in the ball seat, the ball stud including a stud portion extending outward from the ball seat, means for retaining the ball seat in the housing, an indented portion about a perimeter of the ball seat, a dust cover including a raised portion fitted into the indented portion, a contact point between the stud portion and the ball seat when the ball stud is deflected to its maximum angular extent, and means for directing force from the contact point through the ball seat and into the housing at a point remote from, and axially inward of the indented portion.

The above, and other objects, features and advantages of the present invention will become apparent from the following description read in conjunction with the accompanying drawings, in which like reference numerals designate the same elements.

DETAILED DESCRIPTION OF PREFERRED EMBODIMENTS

Figure 1:
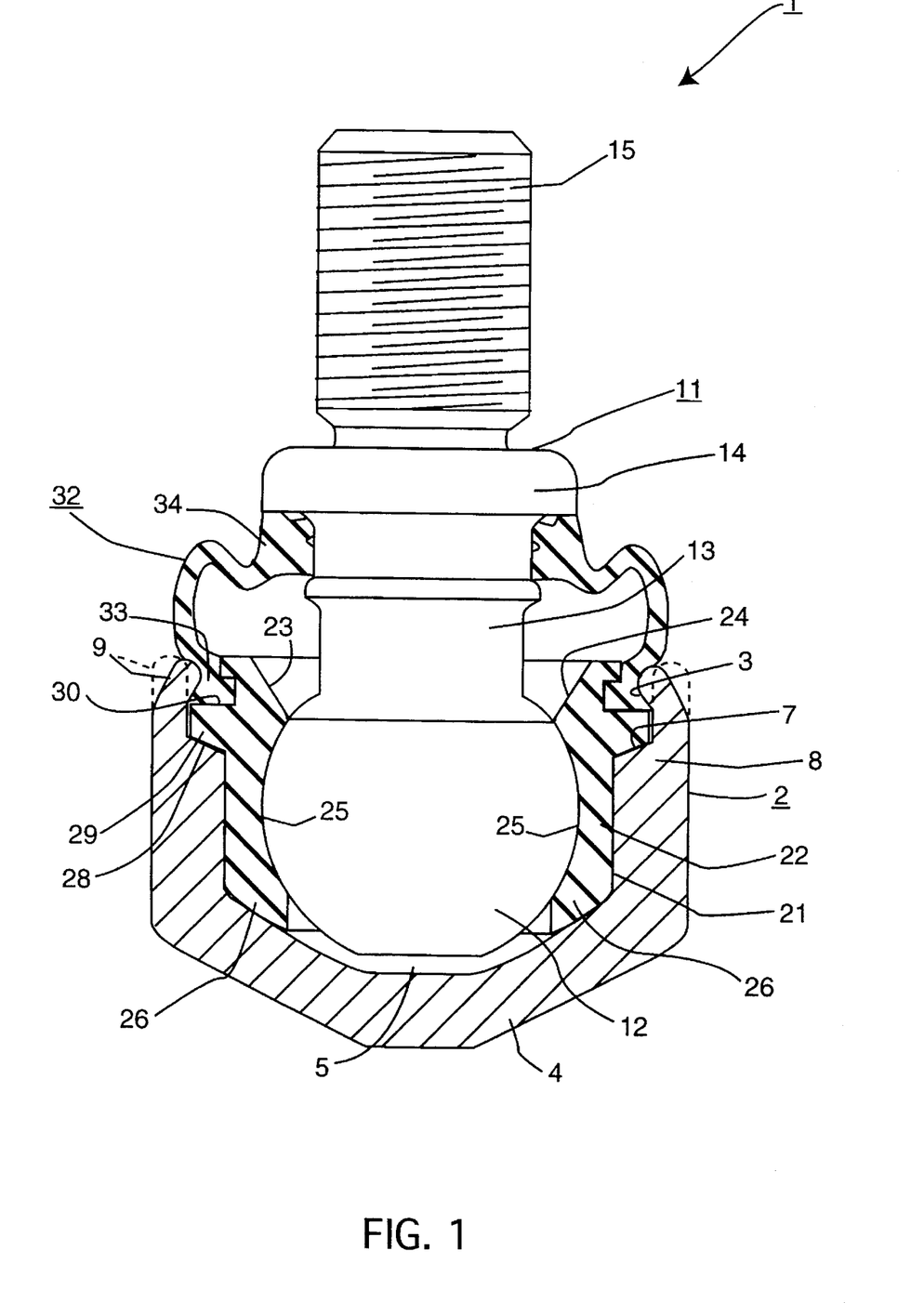
FIG. 1 shows a partial cross section of a rod-end bearing device according to an embodiment of the present invention.

Referring to FIG. 1, a main body 1 of a rod-end bearing device includes a metal housing 2. Housing 2 has an aperture 3 at one of its ends and a closed bottom 4 at the other end thereof. An interior of housing 2 forms a generally cylindrical inner chamber 5 above bottom 4. A flared abutting step 8 around an inner surface of the housing 2 near aperture 3 has an abutting surface 7 that flares towards aperture 3. A portion of metal housing 2 extending from abutting step 8 to aperture 3 is crimped or swaged inward to form a crimped portion 9. Crimped portion 9 is crimped at the end of the process of assembling main body 1. To enable easy crimping, crimped portion 9 is thinner than the remainder of housing 2.

A metallic ball stud 11 includes a ball stud 11 having a ball head 12 at one end and a stud portion 13 integral with ball head 12. A threaded portion 15 extends outward from stud portion 13. A flange portion 14 is located between threaded portion 15 and stud portion 13. Ball head 12 is disposed in inner chamber 5 of housing 2 with stud portion 13 projecting from aperture 3 at the end of housing 2.

A ball seat 21, of synthetic resin, is disposed between the wall of inner chamber 5 of housing 2 and the outer surface of ball head 12 of ball stud 11. Ball seat 21 has a cylindrical body 22 whose outer surface contacts the wall of inner chamber 5. A flared insertion hole 24 at one end of cylindrical body 22 includes an outwardly tapered inner surface 23. Insertion hole 24, at is narrowest point, is smaller than the diameter of ball head 12. The inner wall of cylindrical body 22 is a spherical supporting surface 25 contacting the outer surface of ball head 12, thereby permitting ball head 12 to slide thereon. A seating portion 26 at the lower end of body 22 of ball seat 21 contacts the inner surface of bottom 4.

A thick pressed portion 29 on the outside of ball seat 21 includes a tapered pressed surface 28. Tapered pressed surface 28 widens outward toward insertion hole 24. Tapered pressed surface 28 contacts abutting surface 7 of abutting step 8. Thick pressed portion 29 is pressed firmly into place against tapered pressed surface 28 during assembly of the rod-end bearing device, as will be described. An indented portion 30 forms a groove around an outer surface of thick pressed portion 29 around the edge of insertion hole 24.

Figure 2:
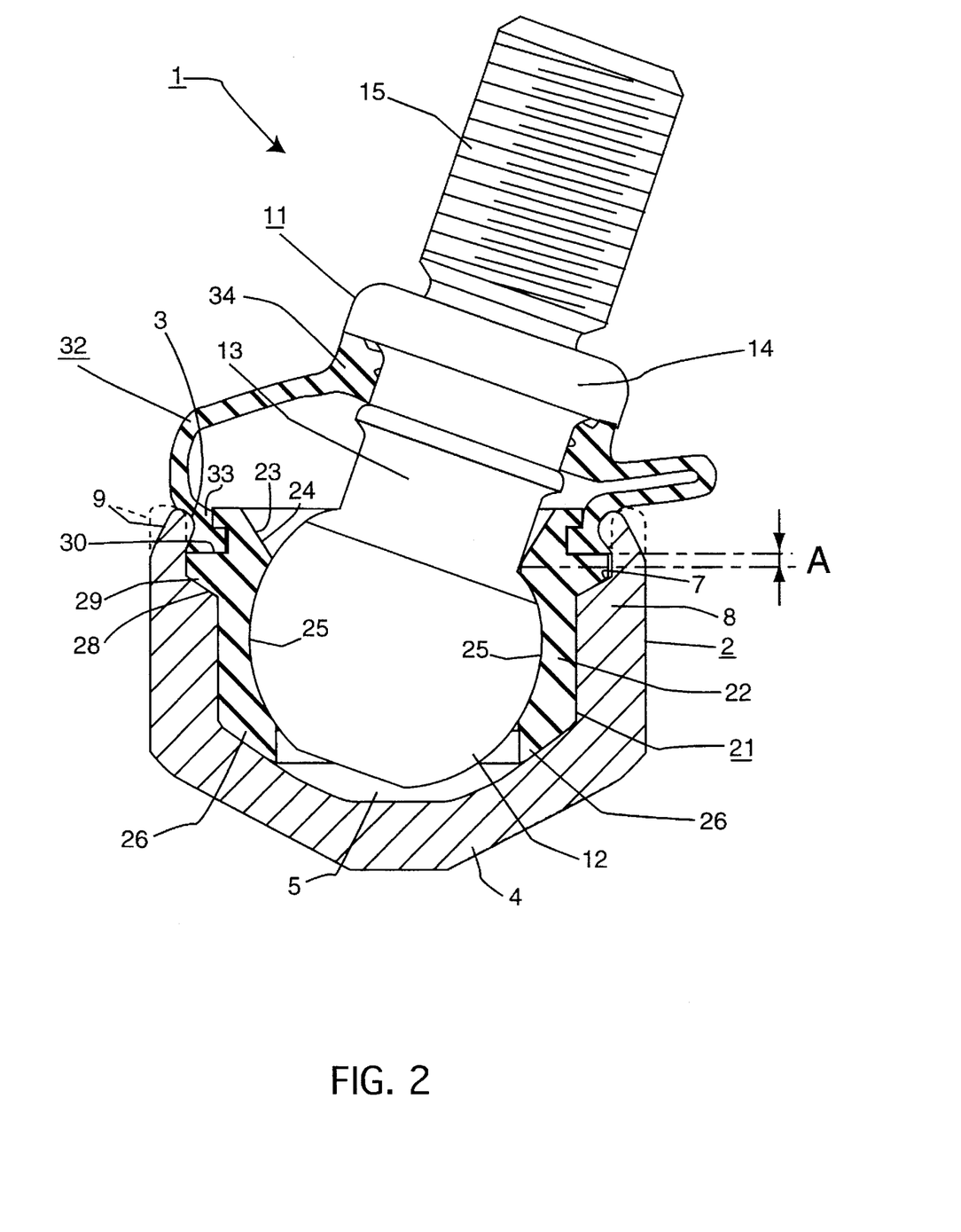
FIG. 2 shows a partial cross section of the main body of the rod-end bearing device when its ball stud is swung to its maximum extent.

Referring now to FIG. 2, when ball stud 11 swings to its maximum extent, stud portion 13 is forced into contact with the narrow portion of tapered inner surface 23 of insertion hole 24, as indicated by an arrow. At that time, indented portion 30 of ball seat 21 is located closer to insertion hole 24 than the line extending from this contact point in the direction in which ball stud 11 swings. More precisely, an edge of indented portion 30 adjacent to pressed surface 28 is located a distance A further outward toward insertion hole 24 than is the contact point between stud portion 13 and ball seat 21.

A dust cover 32 of elastic material, such as rubber, includes an inwardly extending annular raised portion 33 fitted into indented portion 30 of ball seat 21. A lip 34 at the other end of dust cover 32 fits tightly against an outer surface of stud portion 13 of ball stud 11 below flange portion 14.

Figure 3:
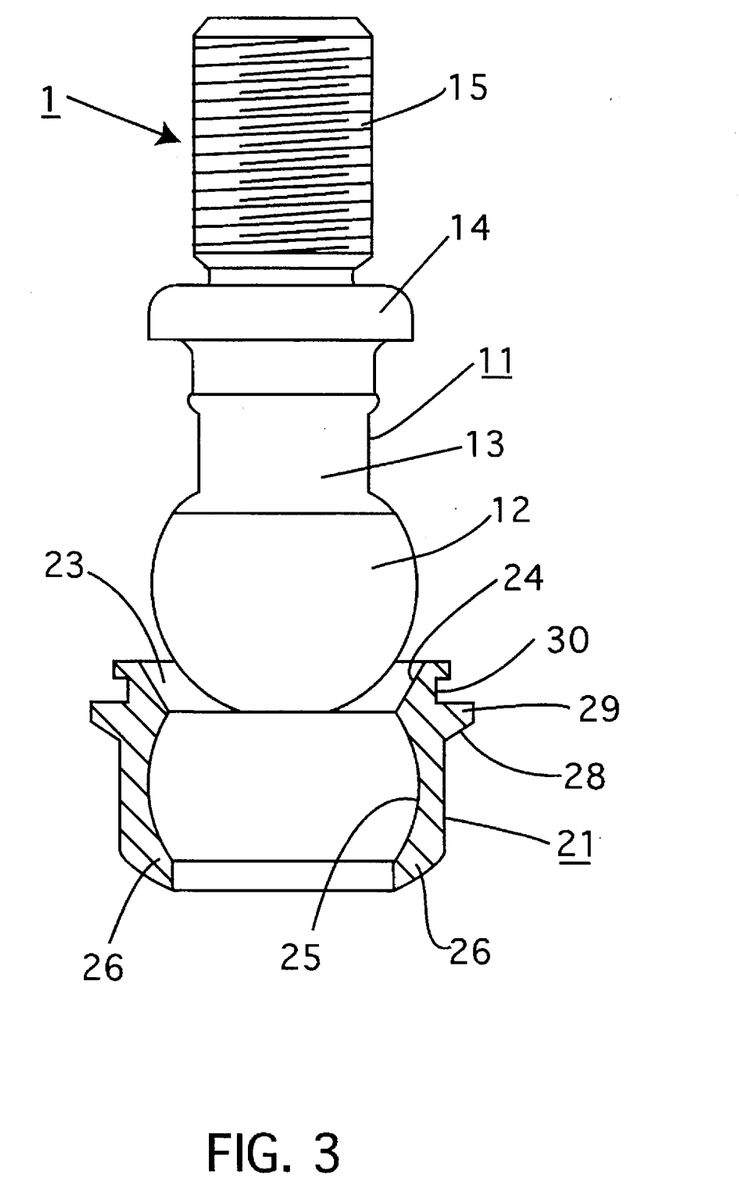
FIG. 3 shows a state in the assembly process of the main body of the rod-end bearing device.

Referring now to FIG. 3, ball head 12 of ball stud 11 is inserted through insertion hole 24 into ball seat 21 until ball head 12 contacts spherical supporting surface 25.

Figure 4:
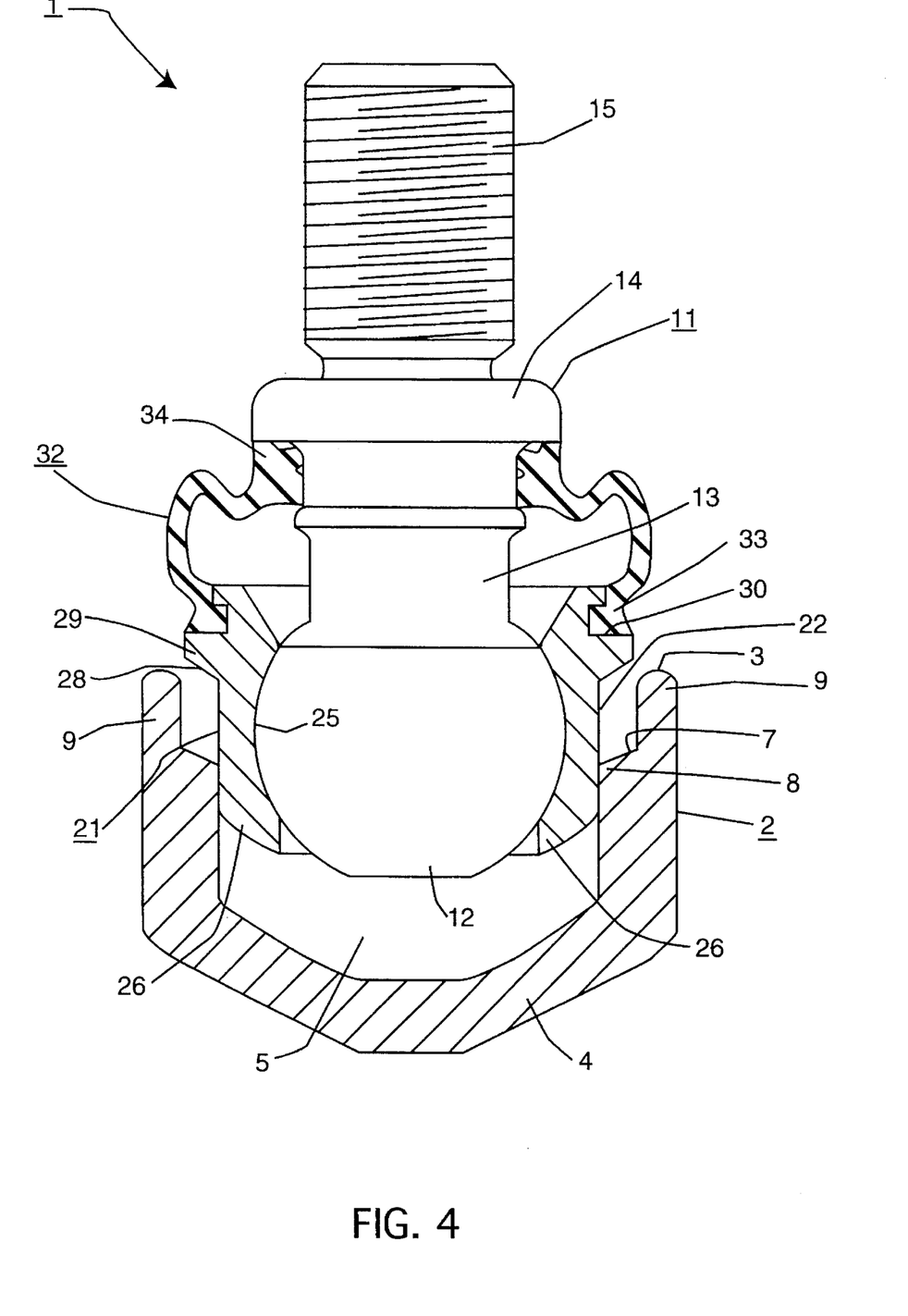
FIG. 4 shows a further state in the assembly process of the main body of the rod-end bearing device.

Referring now to FIG. 4, annular raised portion 33 of dust cover 32 is stretched to fit into indented portion 30 of ball seat 21. Lip 34 of dust cover 32 is stretched around the outer surface of stud portion 13. Then, cylindrical body 22 is forced into cylindrical inner chamber 5 of ball seat 21 until the outside surface of seating portion 26 is forced into contact with the upper surface of bottom 4.

Figure 5:
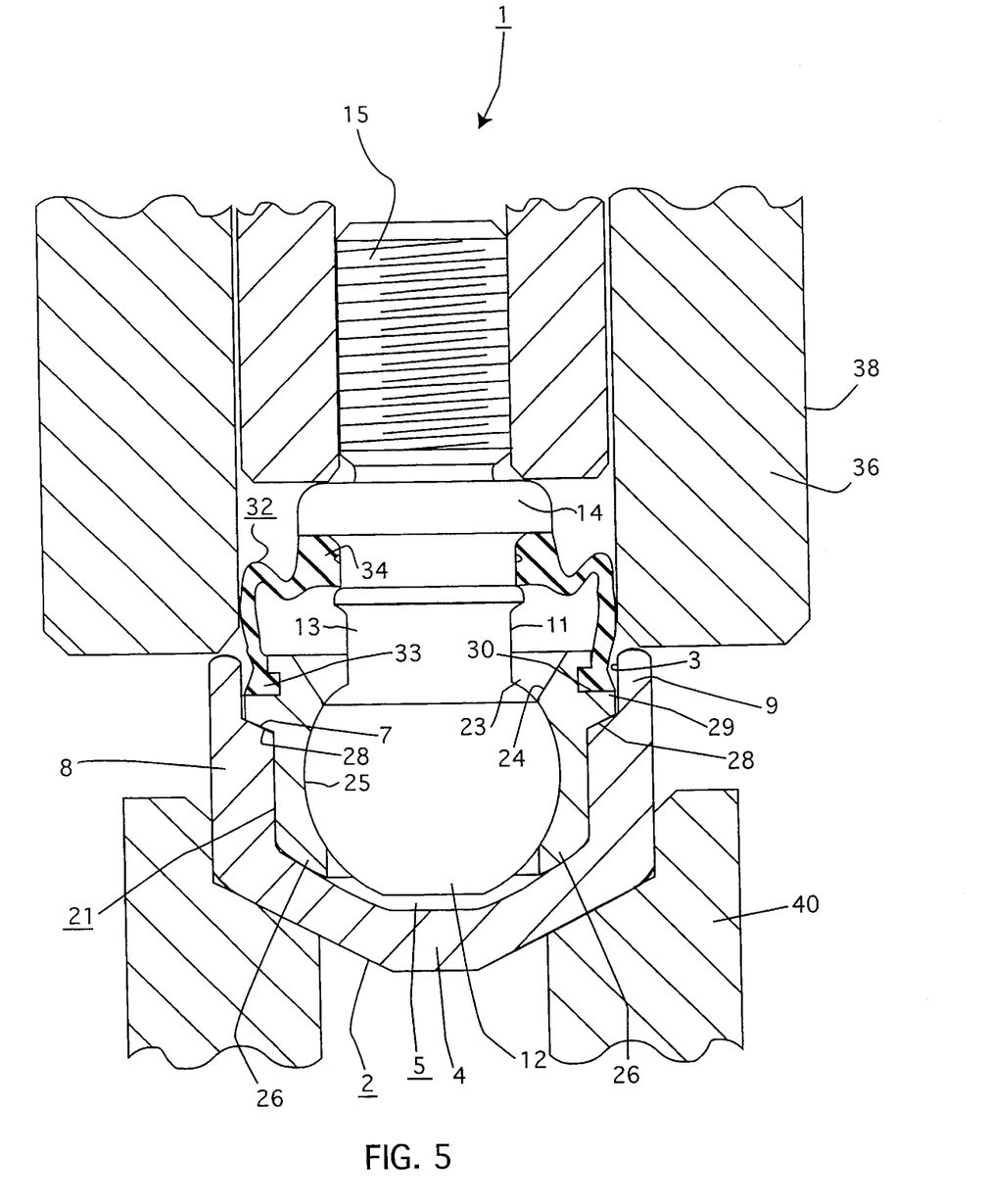
FIG. 5 shows a still further state in the assembly process of the main body of the rod-end bearing device.

Referring now to FIG. 5, a surface of a conical head 36 of a crimping device 38 is urged downward to contact crimped portion 9. A lower end of metal housing 2 is supported in an anvil 40 during the crimping operation.

Figure 6:
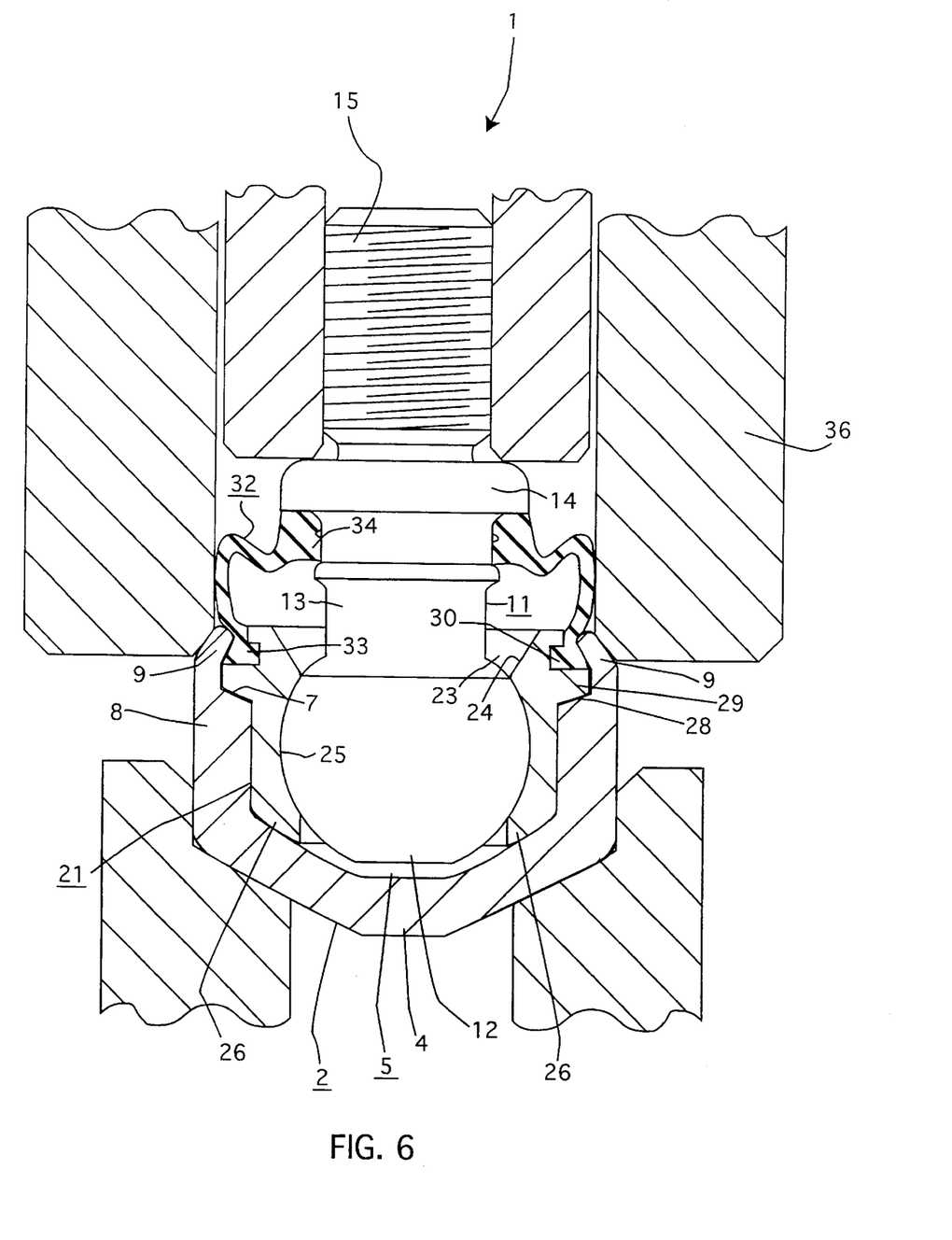
FIG. 6 shows a final state in the assembly process of the main body of the rod-end bearing device.

Referring now to FIG. 6, the main body 1 is shown at the completion of the crimping operation with crimped portion 9 bent inward to lap over an upper edge of thick pressed portion 29 to produce inward forces on an entire outer surface of insertion hole 24 of ball seat 21 and an outer surface of annular raised portion 33. In this manner, all elements are secured in place.

Referring again to FIG. 1, errors in the dimensions of housing 2, ball head 12 or ball seat 21 may cause excess deformation of crimped portion 9. Maintaining the portion of ball seat 21 between the outer surface of indented portion 30 and the insertion hole 24 at a constant thickness (for example 1.5 mm) prevents excess deformation of crimped portion 9. Thus, ball seat 21 deforms toward the central axis as crimped portion 9 is being crimped, thereby reducing supporting pre-load from dust cover 32 and preventing the portion of ball seat 21 around annular raised portion 33 from being damaged.

Referring now to FIG. 2, thick pressed portion 29 near insertion hole 24 is thick enough so that, even with indented portion 30 therein, the remaining portion of ball seat 21 is thick enough to provide a long distance between the inner end of indented portion 30 and the contact point where stud portion 13 comes into contact with insertion hole 24 when ball stud 11 is swung to its maximum extent. Any further force applied to ball stud 11 in the direction of the swing of ball stud 11 when it is swung to its maximum extent, is transmitted directly through thick pressed portion 29 to abutting surface 7, and thence to flared abutting step 8, as indicated by an arrow. This avoids force transmission to crimped portion 9, and to the region of thick pressed portion 29 near indented portion 30. As a result, the region of thick pressed portion 29 holding dust cover 32 remains undistorted and forces tending to distort annular raised portion 33, and cause its sealing function to be reduced fail. The combination of reducing outward forces on crimped portion 9, and diverting outward forces away from annular raised portion 33 protects crimped portion 9 of housing 2 from widening and increases the sealing capability of dust cover 32. In addition, the tendency of ball stud 11 to slip out of ball seat 21 is reduced.

The increased thickness of thick pressed portion 29 inward of indented portion 30, allows insertion hole 24 to be flared widely outward like a trumpet, and thereby increases the permitted maximum angle of swing of ball stud 11. The wide flare of insertion hole 24 permits contact of stud portion 13 with ball seat 21 to take place at the axially inward limit of insertion hole 24, at the point indicated by an arrow. A further consequence of this geometry is that the axially inward portion of indented portion 30 is located the distance A axially outward from the contact point. Therefore, even when ball stud 11 is exposed to a force in the direction of the swing of the ball stud when it is swung to its maximum extent, annular raised portion 33 of dust cover 32 fitted in indented portion 30 is isolated from forces in a direction that would otherwise push annular raised portion 33 axially outward. This prevents crimped portion 9 of housing 2 from being exposed to excess force. Thus crimped portion 9 of housing 2 is prevented from widening, thereby increasing sealing capability of dust cover 32 as well as improving the resistance of ball seat 21 from slipping off ball stud 11.

Furthermore, the flare of insertion hole 24 presents a tapered inner surface 23 where stud portion 13 contacts ball seat 21 when ball stud 11 is swung to its maximum. This increases the maximum swing of ball stud 11. Thus, the invention protects ball seat 21 from permanent deformation or other damage by reducing the force per unit area applied to ball seat 21 in the direction of the swing of ball stud 11.

Although the invention is explained referring to the above embodiment, wherein indented portion 30 is a generally rectangular groove into which is fitted a similarly shaped annular raised portion 33, other mating shapes of these elements may be substituted without departing from the spirit and scope of the invention. For example, indented portion 30 may have a cross section of a portion of a circular concave ring, open at one side, while annular raised portion 33 may have a mating shape.

The same effect as the configuration that calls for forming insertion hole 24 in a flared shape can be obtained by forming ball seat 21 so that indented portion 30 is located closer to insertion hole 24 than is the line extending from the contact point in the direction of the swing of ball stud 11. The contact point is defined as the point at which stud portion 13 of ball stud 11 contacts insertion hole 24 of ball seat 21 when ball stud 11 is swung to its maximum extent.

Instead of flared abutting step 8 contacting abutting surface 7, thick pressed portion 29 may be tapered toward the end of ball seat 21 opposite insertion hole 24 and inner chamber 5 of housing 2 may be made in a flared shape, whose inner surface widens towards aperture 3.

Having described preferred embodiments of the present invention with reference to the accompanying drawings, it is to be understood that the present invention is not limited to the precise embodiments, and that various changes and modifications may be effected therein by one skilled in the art without departing from the scope or spirit of the present invention which is limited only by the appended claims.

What is claimed is:

1. A rod-end bearing device comprising:

a housing;

an inner chamber in said housing;

said inner chamber having an aperture at a first end and an inner surface at a second end thereof;

a ball seat disposed in said inner chamber;

said ball seat having an insertion hole at an end thereof;

said ball seat having an indented portion about its perimeter adjacent to an outer edge of said insertion hole;

a crimped portion at an outer end of said housing crimped over a portion of said ball seat to retain said ball seat in said housing;

a ball stud having a ball head and a stud portion;

said ball head being disposed in said ball seat with an outer surface thereof in sliding contact with said ball seat;

said stud portion projecting from said aperture through said insertion hole;

a dust cover disposed between said housing and said outer surface;

said dust cover having an annular raised portion at a first end thereof;

said annular raised portion being fitted in said indented portion;

said dust cover having a lip at a second end thereof;

said lip fitting on said stud portion;

said stud portion contacting said ball seat at a contact point when said stud portion is at its maximum angular position; and said indented portion being located a distance A axially further outward of said ball seat than said contact point.

2. A device according to claim 1, further comprising:

a tapered pressed surface on an outer perimeter of said ball seat;

said tapered pressed surface being disposed axially inward of said indented portion;

an abutting surface on an inner surface of said housing contacting said tapered pressed surface; and contact forces being directed from said contact point through said tapered pressed surface to said abutting surface at a location remote from said indented portion, whereby a sealing ability of said dust cover is preserved.

3. A rod-end bearing device comprising:

a housing;

an inner chamber in said housing;

said inner chamber having an aperture at a first end and an inner surface at a second end thereof;

a ball seat disposed in said inner chamber;

said ball seat having an insertion hole at an end thereof;

said ball seat having an indented portion about its perimeter adjacent to an outer edge of said insertion hole;

said ball seat having an annular pressed portion projecting outward from said ball seat;

a crimped portion at an outer end of said housing crimped over a portion of said ball seat to retain said ball seat in said housing;

a ball stud having a ball head and a stud portion;

said ball head being disposed in said ball seat with an outer surface thereof in sliding contact with said ball seat;

said stud portion projecting from said aperture through said insertion hole;

a dust cover disposed between said housing and said outer surface; said dust cover having an annular raised portion at a first end thereof;

said annular raised portion being fitted on said annular pressed portion;

said dust cover having a lip at a second end thereof;

said lip fitting on said stud portion; and said annular pressed portion being disposed below an edge of said indented portion.

4. A rod-end bearing device comprising:

a housing;

a ball seat in said housing;

a ball stud;

said ball stud including a ball slidingly fitted in said ball seat;

said ball stud including a stud portion extending outward from said ball seat;

means for retaining said ball seat in said housing;

an indented portion about a perimeter of said ball seat;

a dust cover including a raised portion fitted into said indented portion;

a contact point between said stud portion and said ball seat when said ball stud is deflected to its maximum angular extent; and means for directing force from said contact point through said ball seat and into said housing at a point remote from, and axially inward of said indented portion.

* * * * *